US012669437B2

(12) United States Patent
Swihart et al.

(10) Patent No.: US 12,669,437 B2
(45) Date of Patent: Jun. 30, 2026

(54) ILLUMINATOR SYSTEMS HAVING LIGHT EMITTING DIODES WITH UV ACTIVATION

(71) Applicant: BIO-RAD LABORATORIES, INC., Hercules, CA (US)

(72) Inventors: Stephen Swihart, Walnut Creek, CA (US); Evan Thrush, San Anselmo, CA (US); Kevin McDonald, Novato, CA (US)

(73) Assignee: Bio-Rad Laboratories. Inc., Hercules, CA (US)

( * ) Notice: Subject to any disclaimer, the term of this patent is extended or adjusted under 35 U.S.C. 154(b) by 444 days.

(21) Appl. No.: 17/314,406

(22) Filed: May 7, 2021

(65) Prior Publication Data

US 2021/0356397 A1     Nov. 18, 2021

Related U.S. Application Data

(60) Provisional application No. 63/024,169, filed on May 13, 2020.

(51) Int. Cl.
  *G01N 21/64*     (2006.01)
  *G01N 21/31*     (2006.01)
        (Continued)

(52) U.S. Cl.
  CPC ....... *G01N 21/6456* (2013.01); *G01N 21/314* (2013.01); *G01N 21/33* (2013.01);
        (Continued)

(58) Field of Classification Search
  CPC ......... G01N 2021/3181; G01N 21/314; G01N 21/33; G01N 21/6456; G01N 2201/062; H05B 45/10; H05B 45/20
  See application file for complete search history.

(56) References Cited

U.S. PATENT DOCUMENTS 7,626,739 B2    12/2009  Tregoning
8,974,651 B2 *   3/2015  Chan ................ G01N 27/44721
                                                             204/461
        (Continued)

FOREIGN PATENT DOCUMENTS

WO        2021/231205        11/2021
WO        2023/121948         6/2023
WO        2024/186767 A1      9/2024

OTHER PUBLICATIONS

International Search Report and Written Opinion, International Application No. PCT/US21/31267, PCT/ISA/220, PCT/ISA/210, PCT/ISA/237, mail date Aug. 16, 2021.
        (Continued)

*Primary Examiner* — Hina F Ayub
(74) *Attorney, Agent, or Firm* — SALIWANCHIK, LLOYD & EISENSCHENK

(57)        ABSTRACT

An imaging system including an illuminator apparatus or an epi-illumination apparatus that has LEDs for illuminations is provided for stain-free gel activation and fluorescent sample visualization. The illuminator apparatus includes a housing, a light source array disposed on at least one side surface of the housing and including at least one plurality of LEDs having each LED individually operable to output light of a predetermined color within a range of wavelengths, and a controller for controlling ranges of operational parameters of the at least one plurality of LEDs. The light emitted from the light source array incidents upon a sample having a gel that includes a product of UV light induced reaction between tryptophan and a haloalkane and the light emitted from the light source array includes ultraviolet (UV) light to excite a fluorescent response of the sample.

11 Claims, 8 Drawing Sheets

(51) Int. Cl.

| | |
|---|---|
| *G01N 21/33* | (2006.01) |
| *H05B 45/10* | (2020.01) |
| *H05B 45/20* | (2020.01) |

(52) U.S. Cl.
CPC ............. *H05B 45/10* (2020.01); *H05B 45/20* (2020.01); *G01N 2021/3181* (2013.01)

(56) References Cited

U.S. PATENT DOCUMENTS

| | | | |
|---|---|---|---|
| 9,625,640 | B2 | 4/2017 | Aronson et al. |
| 9,933,565 | B2 | 4/2018 | Swihart et al. |
| 11,035,722 | B2 | 6/2021 | Barak |
| 2003/0230728 | A1* | 12/2003 | Dai .................... G01N 21/6456 |
| | | | 250/458.1 |
| 2006/0030026 | A1* | 2/2006 | Garcia ............. G01N 27/44721 |
| | | | 435/287.1 |
| 2007/0201787 | A1* | 8/2007 | Cross ................. G01N 21/7703 |
| | | | 385/12 |
| 2010/0089753 | A1 | 4/2010 | Edwards et al. |
| 2011/0253541 | A1* | 10/2011 | Chan ................ G01N 27/44721 |
| | | | 204/612 |
| 2012/0001095 | A1 | 1/2012 | Yan et al. |
| 2012/0009088 | A1 | 1/2012 | Yan et al. |
| 2014/0008551 | A1* | 1/2014 | Rudolph ................ B01J 19/123 |
| | | | 250/492.1 |
| 2014/0158541 | A1 | 6/2014 | Beaudet et al. |
| 2015/0093757 | A1 | 4/2015 | Gavin |
| 2017/0016829 | A1 | 1/2017 | Swihart et al. |
| 2017/0102126 | A1* | 4/2017 | Hou ........................ F21V 13/02 |
| 2018/0252676 | A1 | 9/2018 | McKee et al. |
| 2020/0081298 | A1* | 3/2020 | Liao .................. G02F 1/133603 |
| 2020/0120256 | A1 | 4/2020 | Griffin et al. |
| 2021/0215858 | A1* | 7/2021 | Liu ...................... G02B 5/0278 |
| 2021/0302229 | A1 | 9/2021 | Barak |
| 2023/0199130 | A1 | 6/2023 | Swihart et al. |

OTHER PUBLICATIONS

International Search Report and Written Opinion, International Application No. PCT/US2022/053031, mail date Apr. 7, 2023, 7 pages.

Canon; Contact Image Sensors, Canon Website, Article [online], May 2018, retrieved Jul. 13, 2023 from https://web.archive.org/web/20180513030339/http://compo.canon:80/en/product/cis/; 5 pages.

* cited by examiner 280 nm LED Source

Gel Sample
Positioned Here

Power Supply

1

ILLUMINATOR SYSTEMS HAVING LIGHT EMITTING DIODES WITH UV ACTIVATION

CROSS-REFERENCE TO RELATED APPLICATION

This application claims the benefit of U.S. Provisional Application Ser. No. 63/024,169, filed May 13, 2020, which is incorporated herein by reference in its entirety.

BACKGROUND

Visualization of the proteins separated by SDS-PAGE is typically carried out by staining the gel with dyes or fluorescent compounds. The staining procedures involve several hours of protein fixation, staining and destaining. To address issues with the complicated staining procedures, proprietary PAGE gels were developed by Bio-Rad making proteins directly fluorescent after a UV activation step, eliminating the need for the cumbersome staining/destaining procedures.

A commonly used tool for illuminating electrophoretically separated gels is an ultraviolet (UV) transilluminator. If the gel is stained with a UV excitable stain, such as ethidium bromide, Oriole, or the Stain-Free™ gel which is a gel containing a product of UV light induced reaction between tryptophan and a haloalkane, the UV light causes the sample to fluoresce. The transilluminator includes fluorescent bulbs generating UV light and an optical filtering layer. The UV bulbs are mounted within the transilluminator behind a window, which is the optical filtering layer, upon which the sample rests. The window may have an ultraviolet transmitting and ambient (visible) light blocking filter material. In the case of the Stain-Free™ gel which contains a product of UV light induced reaction between tryptophan and a haloalkane, UV light on an order of 6-8 mW/cm$^2$ activates the gel for a period between 45 seconds and 5 minutes. As a result, the reaction covalently binds a trihalo compound to the amino acid tryptophan, which shifts its natural fluorescence under UV radiation from the UV bandwidth range to a visible spectrum. If downstream analysis or purification of bands of interest is desired, the transilluminator is used to illuminate the sample with a UV blocking shield placed between the user of the transilluminator and the sample. Bands are excised from the gel before further steps are undertaken. Liquid Chromatography (LC) followed by mass spectrometry may be used for protein samples or extraction for cloning purposes when the sample is DNA.

However, to image a "safe" gel such as the cyanine SYBR (developed by Life Tech, now Thermo) or the intercalating GelGreen (made by Biotium) which can be excited using blue light, or to image a coomassie gel typically illuminated by white light which absorbs light so bands appear dark, additional trays containing fluorescent and/or filtering layers to absorb UV light and providing blue or white light to the sample are required to be attached to the transilluminator, making the transilluminator setup more sizable and more costly to fabricate, more difficult to manipulate.

BRIEF SUMMARY

There continues to be a need in the art for improved designs and techniques for sample visualization using illumination apparatus and systems.

Embodiments of the subject invention pertain to an illumination apparatus having light emitting diodes (LEDs) for sample visualization that is light-weight, low cost, and energy efficient.

In an embodiment, an illuminator apparatus can comprise: a housing; a first light source array disposed on at least one first side surface of the housing, including at least one first plurality of LEDs wherein each LED is individually operable to emit light of a predetermined color within a first range of wavelengths; and a controller for controlling ranges of operational parameters such as voltages, currents, or intensity of the at least one first plurality of LEDs. The controller can be configured to emit light of the range of the wavelengths of the at least one first plurality of LEDs. The illuminator apparatus can further comprise a second light source array disposed on at least one second side surface of the housing, including at least one second plurality of LEDs wherein each LED is individually operable to emit light of a predetermined color within a second range of wavelengths. The first light source array can be a one-dimensional or a two-dimensional array of a set of the first plurality of LEDs. The first light source array can include a set of the first plurality of LEDs operable to output light within the first range of wavelengths. In addition, the controller can be configured to adjust the wavelength of the plurality of LEDs to emit light of one predetermined color to a variety of different colors.

The illuminator apparatus can further comprise at least one LED light emission cone disposed on the first side surface of the housing, surrounding the at least one first plurality of LEDs to collect light emitted by the LED and transmit the light through the housing; a total internal reflection (TIR) layer disposed in a central space of the housing, configured such that light emitted by the at least one first plurality of LEDs propagates through the TIR layer within space of the housing; a diffusing layer disposed on a top surface of the TIR layer for diffusing light; a plurality of vertical prism layers disposed on a top surface of the diffusing layer; and a retaining structure such as a clip disposed on inner side surfaces of the housing to surround entire perimeter of the chamber. Furthermore, the controller can be configured to modulate an intensity of light output from the first light source array by adjusting optical power of the first light source array. Furthermore, the light emitted from the first light source array incident upon a sample comprising a gel that comprises a product of UV light induced reaction between tryptophan and a haloalkane and the light emitted from the first light source array comprises ultraviolet (UV) light. The optimum wavelength for maximum relative reaction efficiency is determined to be 280 nm or about 280 nm. The light emitted from the first light source array can excite a fluorescent response of a sample.

In another embodiment, an illuminator apparatus can comprise: a housing; a first light source array disposed on at least one first side surface of the housing, including at least one first plurality of LEDs wherein each LED is individually operable to emit light of a predetermined color within a first range of wavelengths; a controller for controlling ranges of operational parameters of the at least one first plurality of LEDs; and a detector for detecting the light output.

In some embodiments, an illuminator apparatus can comprise: a housing; a first light source array disposed in the housing, including at least one first plurality of LEDs wherein each LED is individually operable to emit light of a predetermined color within a first range of wavelengths; a second light source array disposed in the housing, including at least one second plurality of LEDs wherein each LED is individually operable to emit light of a predetermined color within a second range of wavelengths; a controller for controlling the range of the voltages, currents, or intensities of the at least one first plurality of LEDs; the first light source array and the second light source array each is a two-dimensional array, and the first light source array and the second light source array interlace with each other.

In certain embodiments, an epifluorescence (EPI) illuminator apparatus can comprise: a housing; a first light source array disposed in the housing, including at least one first plurality of LEDs wherein each LED is individually operable to emit light of a predetermined color within a first range of wavelengths of about 200-about 325 nm with a peak of 280 nm for driving reactions such as a stain-free reaction between tryptophan and haloalkanes which can be efficiently driven by light centered at about 280 nm; and a controller for controlling the intensity of the at least one first plurality of LEDs.

DETAILED DESCRIPTION

Embodiments of the subject invention provide utilization of an illumination apparatus having light emitting diodes (LEDs) for activation of a gel that comprises a product of UV light induced reaction between tryptophan and a haloalkane and fluorescent sample visualization.

In the context used herein, the term "ultraviolet light" means light energy having a wavelength between about 250 nm to about 400 nm.

Example 1: Side-Lit Illuminator Having Light Emitting Diodes (LEDs)

Figure 1:
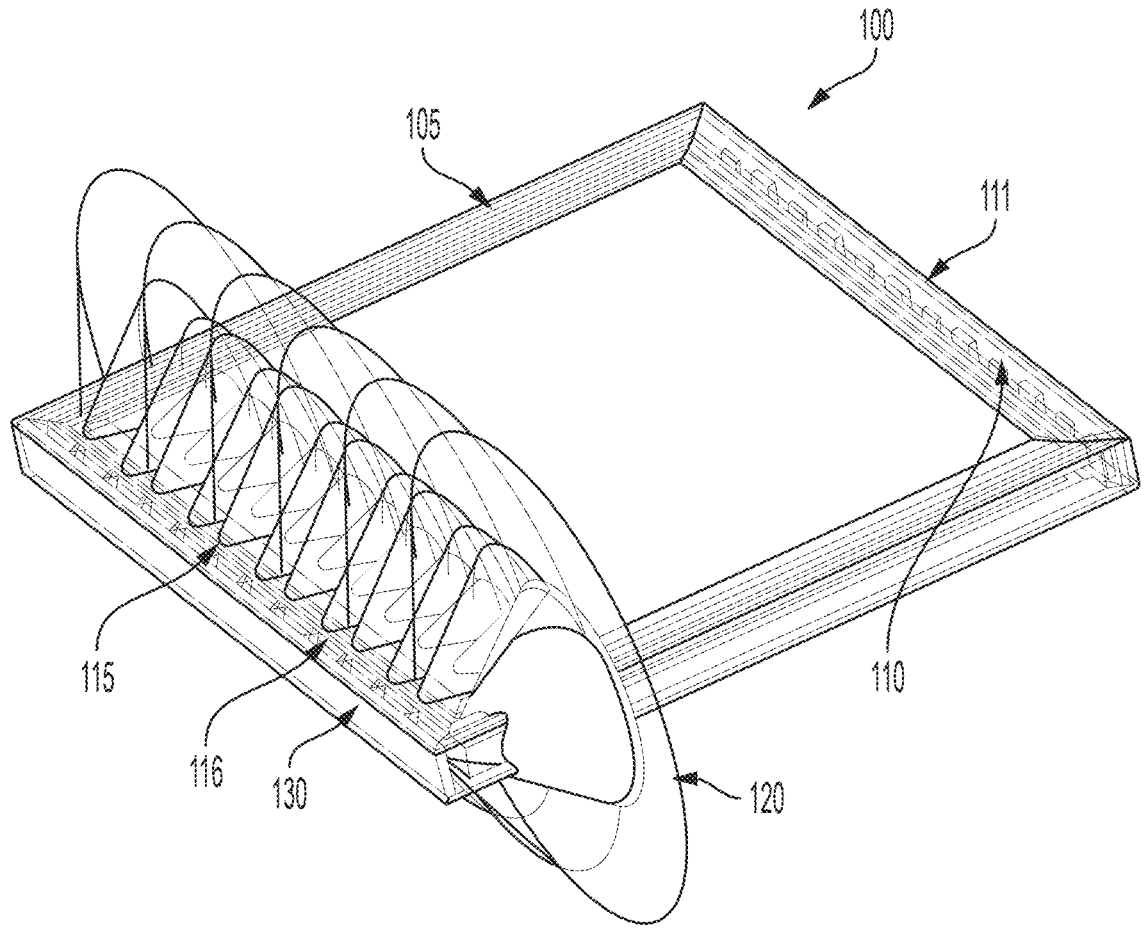
FIG. 1 is a perspective view of a side-lit illuminator apparatus having LEDs according to an embodiment of the subject invention.

Referring to FIG. 1, a side-lit illuminator apparatus having LEDs 100 can comprise a housing 105 having interconnected bottom substrate and sidewalls that define an internal chamber; a first light source array 110 disposed on at least one first side surface of the housing 105 and including at least one first plurality of LEDs 111 operable to output light at a first wavelength or within a first range of wavelengths; a second light source array 115 disposed on at least one second side surface of the housing 105 and including at least a second LED 116 operable to output light at a second wavelength within a second range of wavelengths; at least one LED light emission cone 120 disposed on the first side surface and/or the second side surface of the housing 105 and surrounding the at least one first plurality of LEDs 111 and/or the at least one second plurality of LEDs 116; and a controller 130 for controlling ranges of operational parameters such as wavelength of the at least one first plurality of LEDs 111 and the at least one first plurality of LEDs 116.

In one embodiment, the first light source array 110 of the illuminator apparatus 100 includes a one-dimensional array of a plurality of the first LEDs 111 or a two-dimensional array of a plurality of the first LEDs 111 that are oriented in a horizontal plane below the sample and connected to a printed circuit board (not shown) that energizes the diodes. The LEDs of plurality of the first LEDs 111 are spaced apart.

In another embodiment, the second light source array 115 of the illuminator apparatus 100 includes a one-dimensional array of a plurality of the second LEDs 116 or a two-dimensional array of a plurality of the second LEDs 116 that are connected to the printed circuit board that energizes the diodes. The LEDs of plurality of the second LEDs 116 are spaced apart.

The LEDs 115 or 116 are positioned on at least one side surface of the housing 105 so that the light output by the LEDs 115 or 116 impinged on a sample (not shown) from the side of the sample. The sample becomes visible and/or produces a fluorescent response in the presence of light energy in a predefined light spectrum.

The housing 105 may optionally comprise a cover (not shown) for protecting an operator from potentially harmful electromagnetic radiation such as ultraviolet radiation, when, and/or if, wavelengths in these spectrums are employed. Alternatively or additionally, the cover may assist in providing color contrast and/or color cancellation of visible light to enhance the visualization of the specimen. The cover can be a separate shield removable from the housing 105 or may be removable but hinged to the housing 105 for use during excision for ease of accessing the top of the housing. When the illuminator is disposed in an open space, the cover may be installed to the illuminator to cover a part or the entirety of the illuminator.

Referring again to FIG. 1, the controller 130 of the illuminator apparatus 100 can be configured to select or adjust the wavelength of the at least one first plurality of LEDs 111 or the at least one second plurality of LEDs 116 to emit light of one predetermined color.

The controller 130 can comprise a switch for selectively operating the associated light source arrays 110/115, for example where the illumination device 100 is under the manual control of an operator. Alternatively or in addition, the controller 130 can comprise a programmable device executing instructions regarding the operation of the light source arrays 110/115. In addition to providing manual or automated switching capabilities, the controller 130 can be operated to vary the intensity of the light produced by the light source arrays 110/115. For example, in accordance with an embodiment of the subject invention, the controller 130 provides a pulse width modulated signal to the light source array 110/115 being operated. As can be appreciated by one of skill in the art, by varying the duty cycle of a signal provided to the light source array 110/115, the intensity of the light produced by the light source array 110/115 can be varied.

As can be appreciated by one of skill in the art, the controller 130 may control a separate or integrated amplifier for providing power to the light source arrays 110/115.

Moreover, the controller 130 of the illuminator apparatus 100 can be configured to vary the intensity of the at least one first plurality of LEDs 111 or the at least one second plurality of LEDs 116 by individually switching on or off a different LED with a predetermined wavelength to emit lights of a variety of different colors.

As illustrated by FIG. 1, the at least one LED light emission cone 120 can comprise a plurality of LED light emission cones 120 each having a shape tapering from a distant edge to a point or a near edge that is disposed on the first or second side surface of the housing 105. The one or more first LEDs 111 or one or more second LEDs 116 can be received in hollow space of a corresponding LED light emission cone 120 such that the light emitted by the first or second LEDs 111/116 are collected by the inner surfaces of the LED light emission cones 120 and are reflected to transmit through the housing 105.

Figure 2:
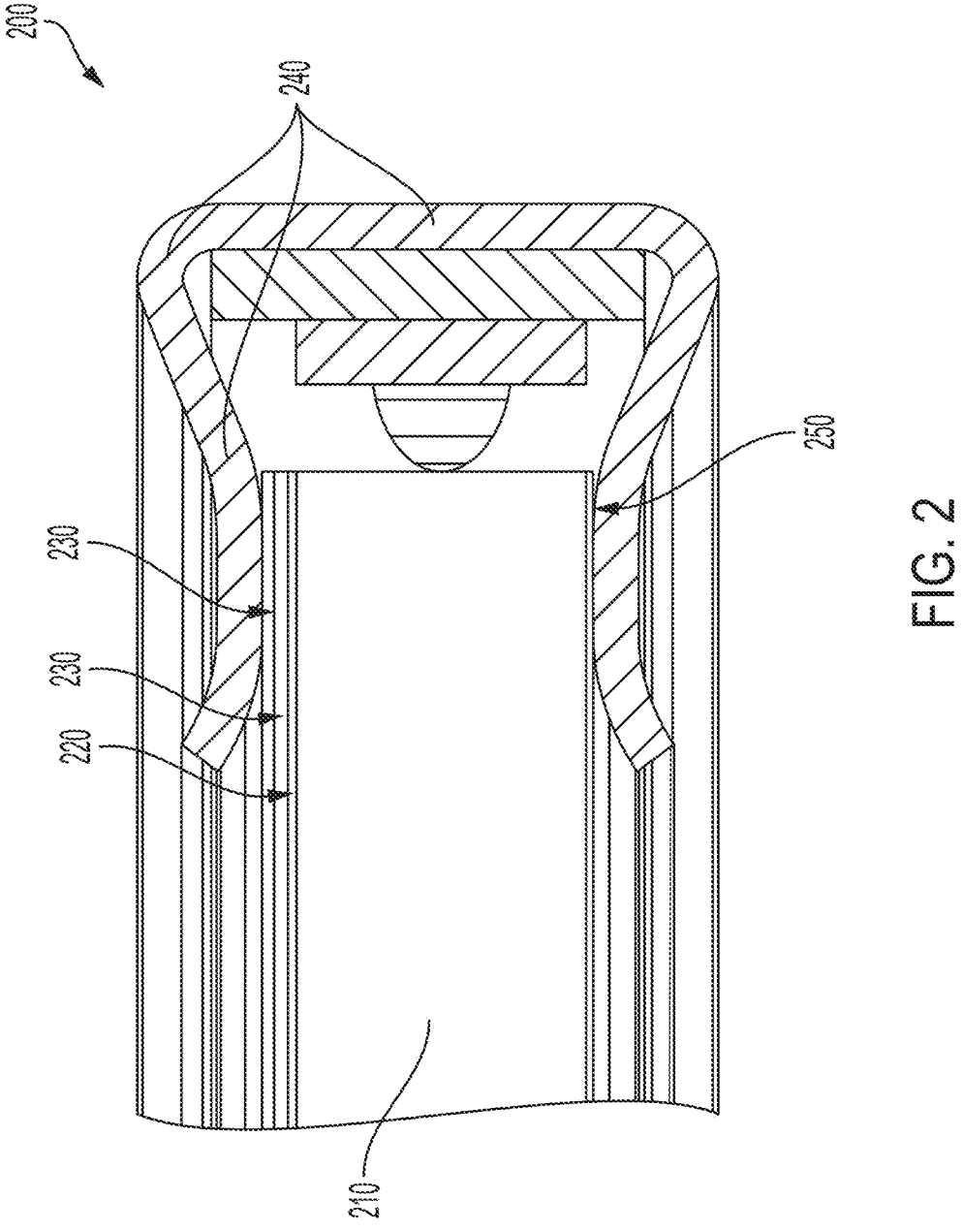
FIG. 2 is a cross-sectional view of the side-lit illuminator apparatus having LEDs according to an embodiment of the subject invention.

FIG. 2 is a cross-sectional view of the side-lit illuminator apparatus such as a transilluminator apparatus having LEDs 100 according to an embodiment of the subject invention. The transilluminator apparatus 100 can further comprise a total internal reflection (TIR) layer 210, a diffusing layer 220, a plurality of vertical prism layers 230, a retaining structure such as a clip 240, and a reflective layer 250. The (TIR) layer 210 is disposed in a central space of the housing 105 and configured such that light emitted by the at least one first plurality of LEDs 111 or the at least one second plurality of LEDs 116 propagates through the TIR layer 210 within the space of the housing 105. The diffusing layer 220 is disposed on a top surface of the TIR layer 210 for diffusing light and a plurality of vertical prism layers 230 disposed on a top surface of the diffusing layer 220. The retaining structure such as a clip 240 is disposed on inner side surfaces of the housing to surround entire perimeter of the chamber of the housing. The reflective layer 250 is disposed on a bottom surface of the TIR layer 210 and/or a filter (not shown) to eliminate light of certain wavelength from the light emitted by the at least one first plurality of LEDs 111 and/or the at least one second plurality of LEDs 116.

Figure 3A:
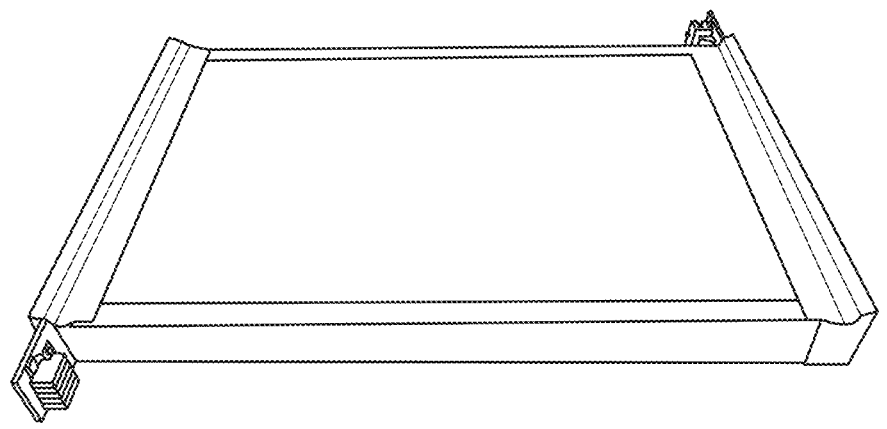
FIG. 3(a) is a perspective view of a prototype of the side-lit illuminator apparatus having LEDs, according to an embodiment of the subject invention.
Figure 3B:
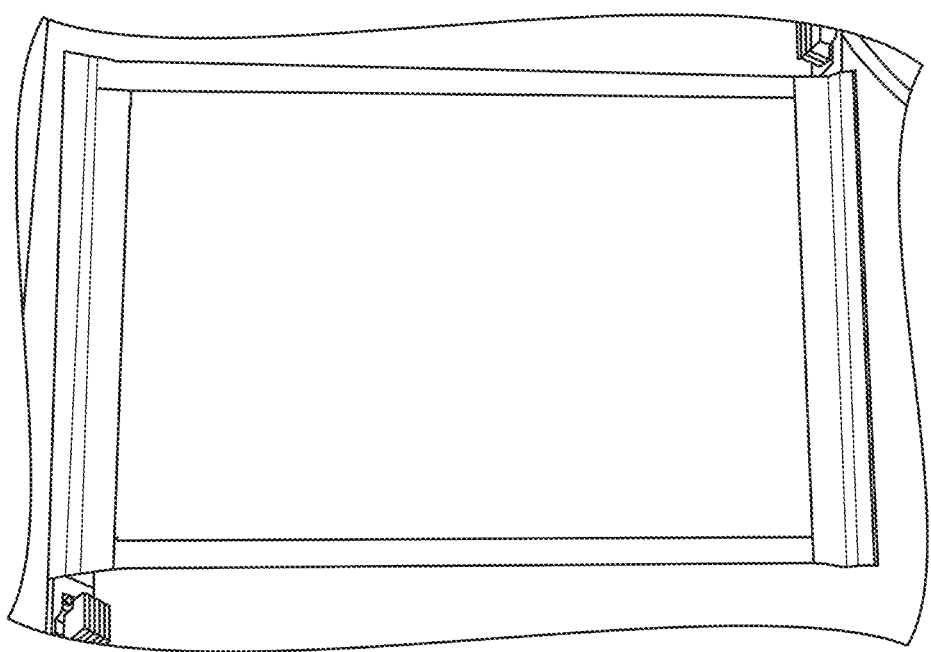
FIG. 3(b) is a top view of a prototype of the side-lit illuminator apparatus having LEDs, according to an embodiment of the subject invention.

Referring to FIGS. 3(*a*) and 3(*b*), a perspective view of a prototype of the side-lit transilluminator apparatus having LEDs and a top view of the prototype of the side-lit transilluminator apparatus having LEDs are shown.

In one embodiment, the side-lit transillumination assembly can comprise one or more boards that are strip-shaped with a plurality of individually addressable sets of LEDs, each set emitting light of one color. The boards are disposed on one or more sides of the assembly and the light is emitted into a TIR layer comprising borosilicate glass or quartz, allowing the UV light to be transmitted to the material. A deliberately applied light-scattering pattern can be formed on one side of the glass or quartz plate so that the light incident on elements of the pattern will not be reflected (when incident angle>TIR angle) and will be emitted toward the sample. The pattern may be applied by laser, chemical etching, printing, or other means and in the case of laser etching, may have the points at the surface or inside the material. An alternate embodiment could be inclusion of small bits of an additional material within the first material in a light-scattering pattern. A reflective layer can be applied to the bottom surface that is opposite to the sample/emitting surface and on some of the sides not containing the LED boards. It could also be applied to the sides with the LED boards, with portions of the side not made reflective to allow the light in. The reflective surface can be formed as a separate part.

In one embodiment, the TIR layer is formed with a flat shape, a tapered shape, a plurality of layers having a cross-sectional area of a circular shape, or a plurality of layers having a cross-sectional area of a rectangular or square shape.

In another embodiment, the side-lit transillumination assembly can comprise one or more boards with a plurality of individually addressable sets of LEDs, each set emitting light of one color. The boards emit light into a rod spanning the length or width of the transilluminator, and the light propagates along the rods via the total internal reflection. The rods can have a pattern applied using methods described above to cause light to incident to elements of the pattern to hit at an incident angle greater than the TIR angle in that material. Boards can be mounted on both sides of the rod (for example, each end). Multiple board/rod sets can be utilized, in parallel to each other. Reflector can be applied to both the bottom surface of each rod and below the rods, to direct the emitted light upward. The cross-sectional shape of the rods can be circular or any other two-dimensional (2D) shape including, but not limited to, arcs, lines and splines, and designed to maximize the illumination intensity and uniformity.

Example 2: Illuminator Having a Two-Dimensional (2D) Array of LEDs

Figure 4A:
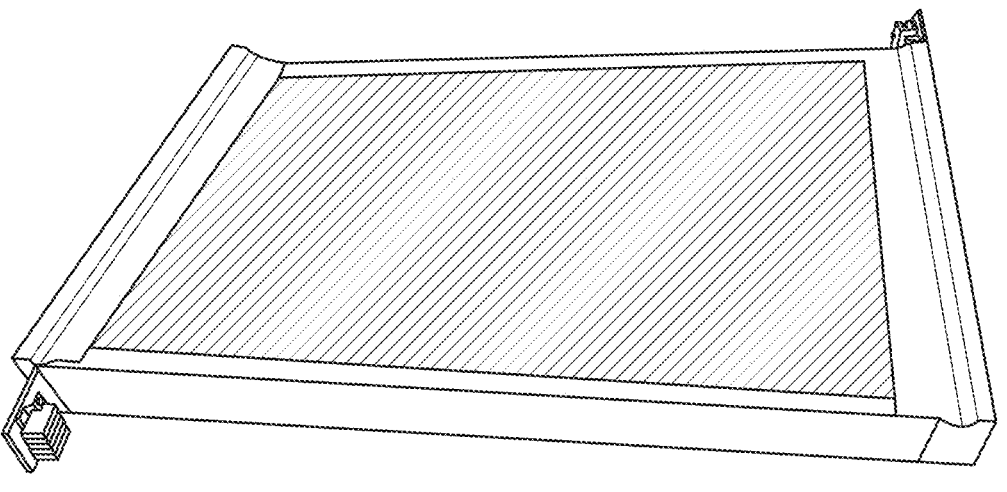
FIG. 4(a) is a perspective view of a prototype of a two-dimensional (2D) array of LEDs of an illuminator apparatus according to an embodiment of the subject invention.
Figure 4B:
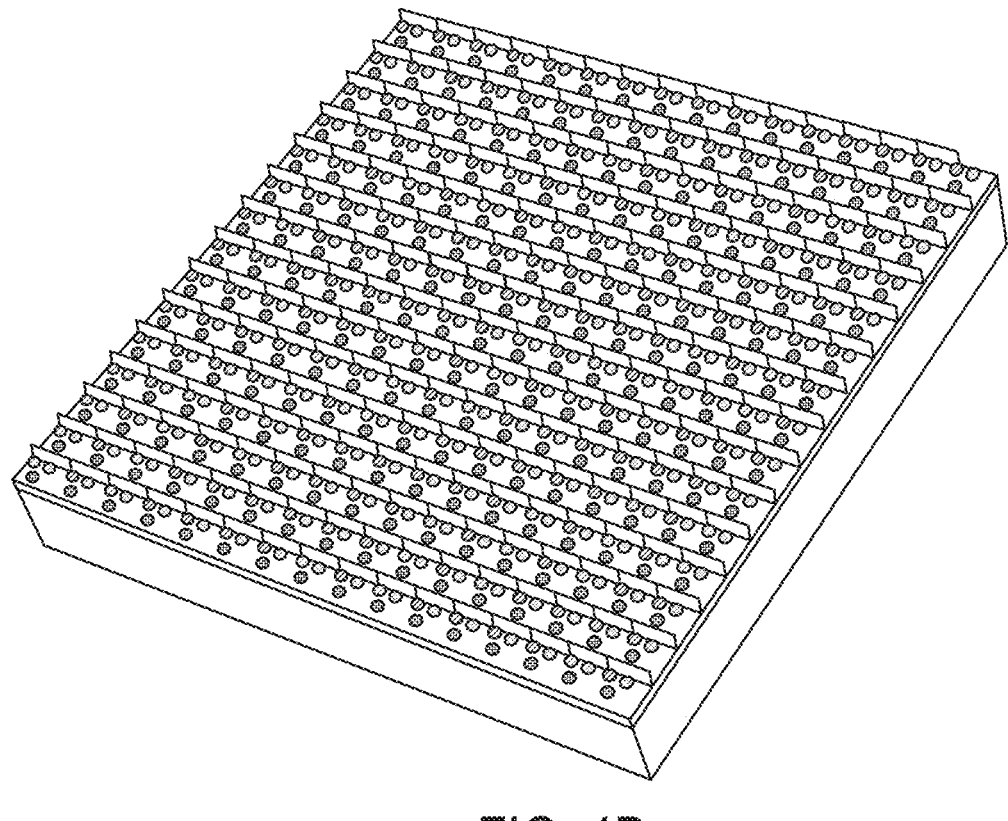
FIG. 4(b) schematically illustrates a 2-D array of LEDs of an illuminator apparatus according to an embodiment of the subject invention.

FIG. 4(*a*) is a perspective view of a prototype of a two-dimensional (2D) array of LEDs of an illuminator apparatus according to an embodiment of the subject invention. FIG. 4(*b*) schematically illustrates a 2-D array of LEDs of an illuminator apparatus according to an embodiment of the subject invention.

The illuminator apparatus 100 can comprise a first light source array 110 including at least one first plurality of LEDs 111 wherein each LED is individually operable to emit light of a predetermined color within a first range of wavelengths; and a second light source array 115 including at least one second plurality of LEDs 116 wherein each LED is individually operable to emit light of a predetermined color within a second range of wavelengths. The first light source array 110 and the second light source array 115 each is a two-dimensional array, and the first light source array 110 and the second light source array 115 interlace with each other.

Example 3: Illuminator Having LEDs Illuminating Light at a Wavelength of 280 nm

Figure 5:
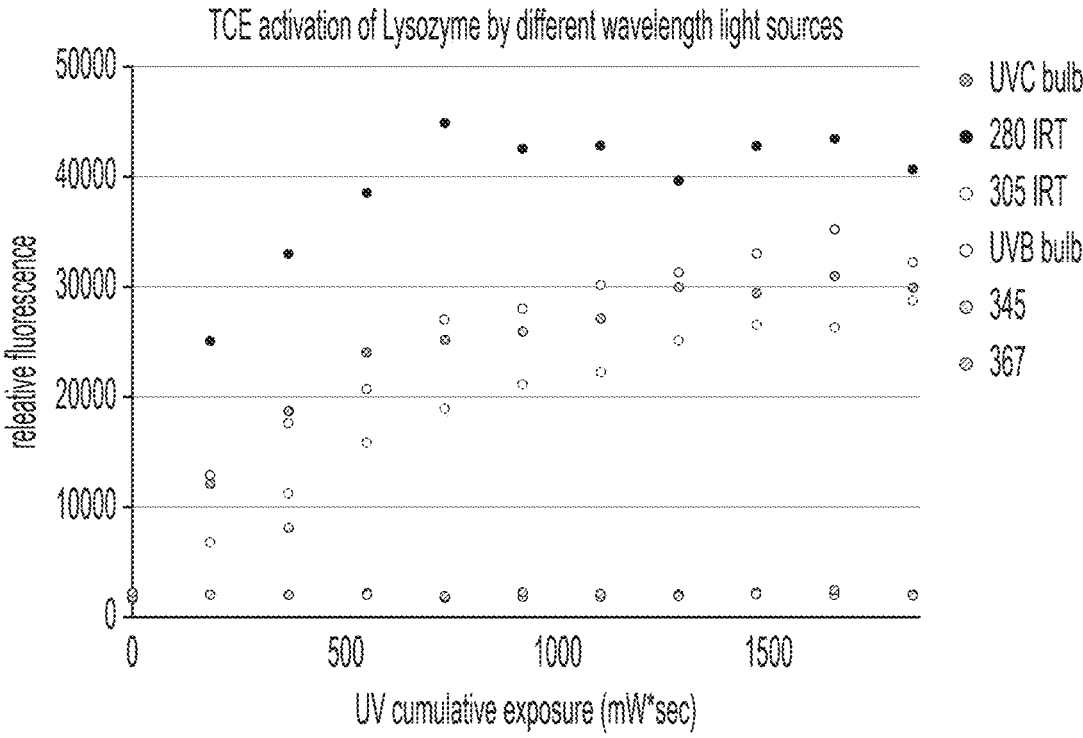
FIG. 5 shows a plot of trichloroethylene (TCE) activation of lysozyme by light sources of different wavelengths illustrating relationships between UV cumulative exposure and relative florescence according to an embodiment of the subject invention.

FIG. 5 shows a plot of trichloroethylene (TCE) activation of lysozyme by light sources of different wavelengths illustrating relationships between UV cumulative exposure and relative fluorescence according to an embodiment of the subject invention. The TCE and lysozyme solution is illuminated by a variety of light sources of different wavelengths, including about 254 nm of UV bandwidth, about 280 nm, about 305 nm, about 302 nm of UV bandwidth, about 345 nm, and about 367 nm. It is observed from FIG. 5 that at an optimal wavelength of about 280 nm, such that a maximum relative activation efficiency can be achieved.

In another embodiment, the controller 130 of the illuminator apparatus 100 can be configured to control the least a first LED and the at least one second plurality of LEDs to emit light during different periods of time.

In one embodiment, the controller 130 of the illuminator apparatus 100 can be configured to modulate an intensity of light output from the first light source array or the second light source array by adjusting optical power of the first light source array or the second light source array.

In one embodiment, when the at least one first plurality of LEDs emits light having the optimum wavelength characteristic of about 280 nm, the controller 130 can be configured to adjust optical power of the at least one first plurality of LEDs to determine effects of various activation time and power of the at least one first plurality of LED.

Figure 6A:
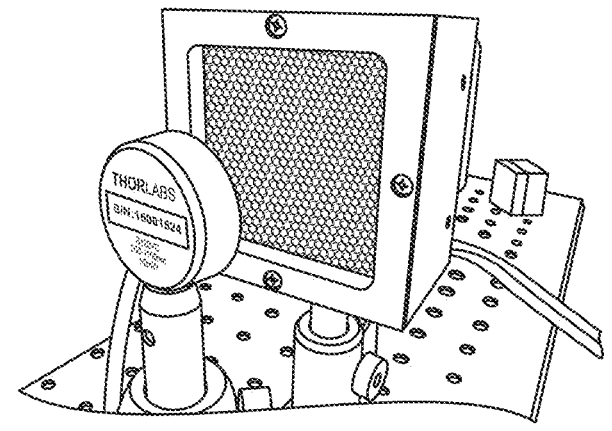
FIGS. 6(a)-(b) are perspective views of a prototype of a LED assembly of an illuminator apparatus illuminating at a wavelength of 280 nm according to an embodiment of the subject invention.
Figure 6B:
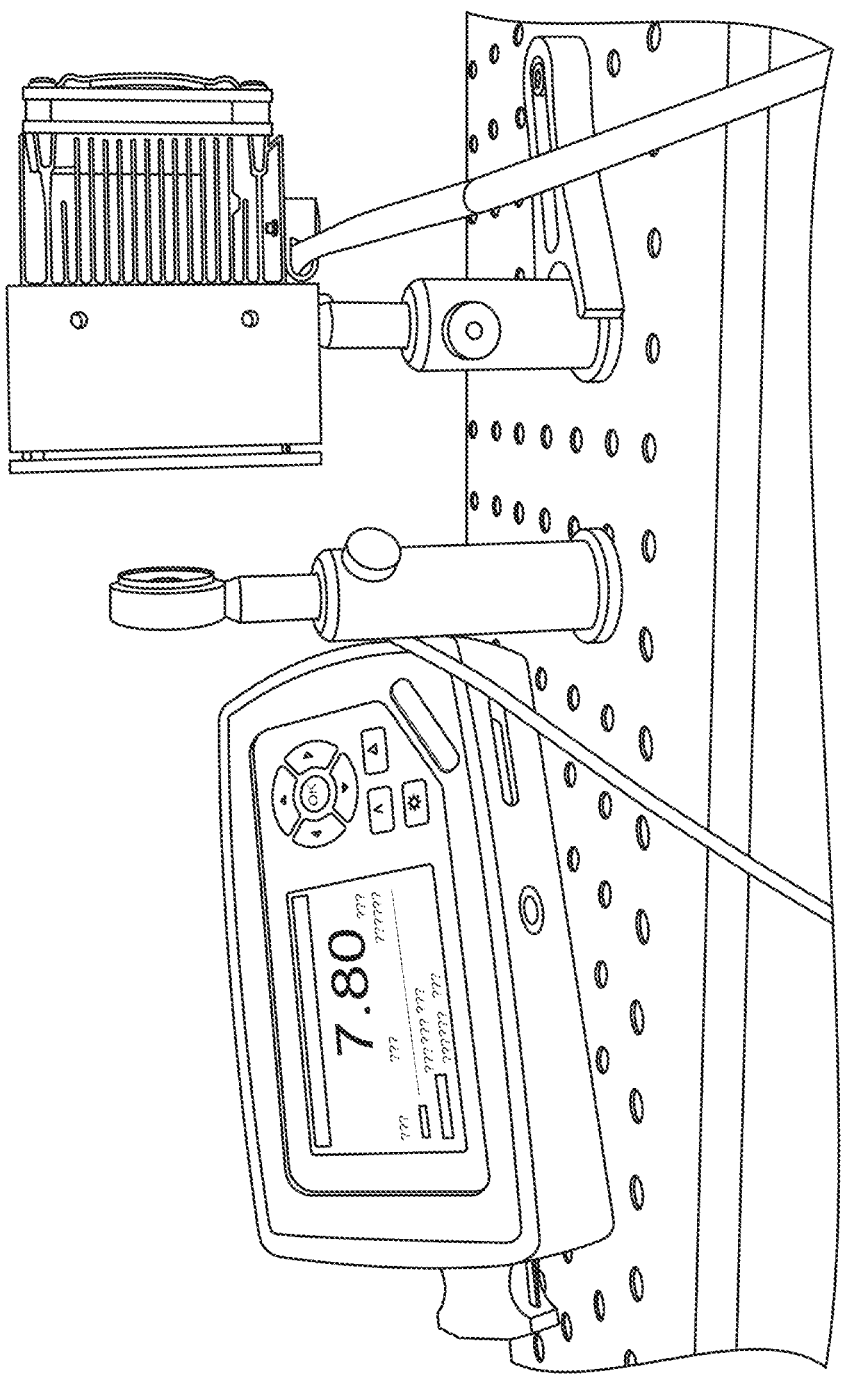

The illuminator apparatus 100 having a broad-area illumination source having LEDs of 280 nm wavelength are tested to determine the activation time and the power for matching the gel band intensity of a conventionally activated gel (the conventional activation times may vary from 45 seconds to about 5 minutes) by adjusting optical power from the LED source until they are equal. Referring to FIGS. 6(*a*)-(*b*), perspective views of a prototype of a LED assembly of a illuminator apparatus illuminating at a wavelength of 280 nm are shown.

Figure 7:
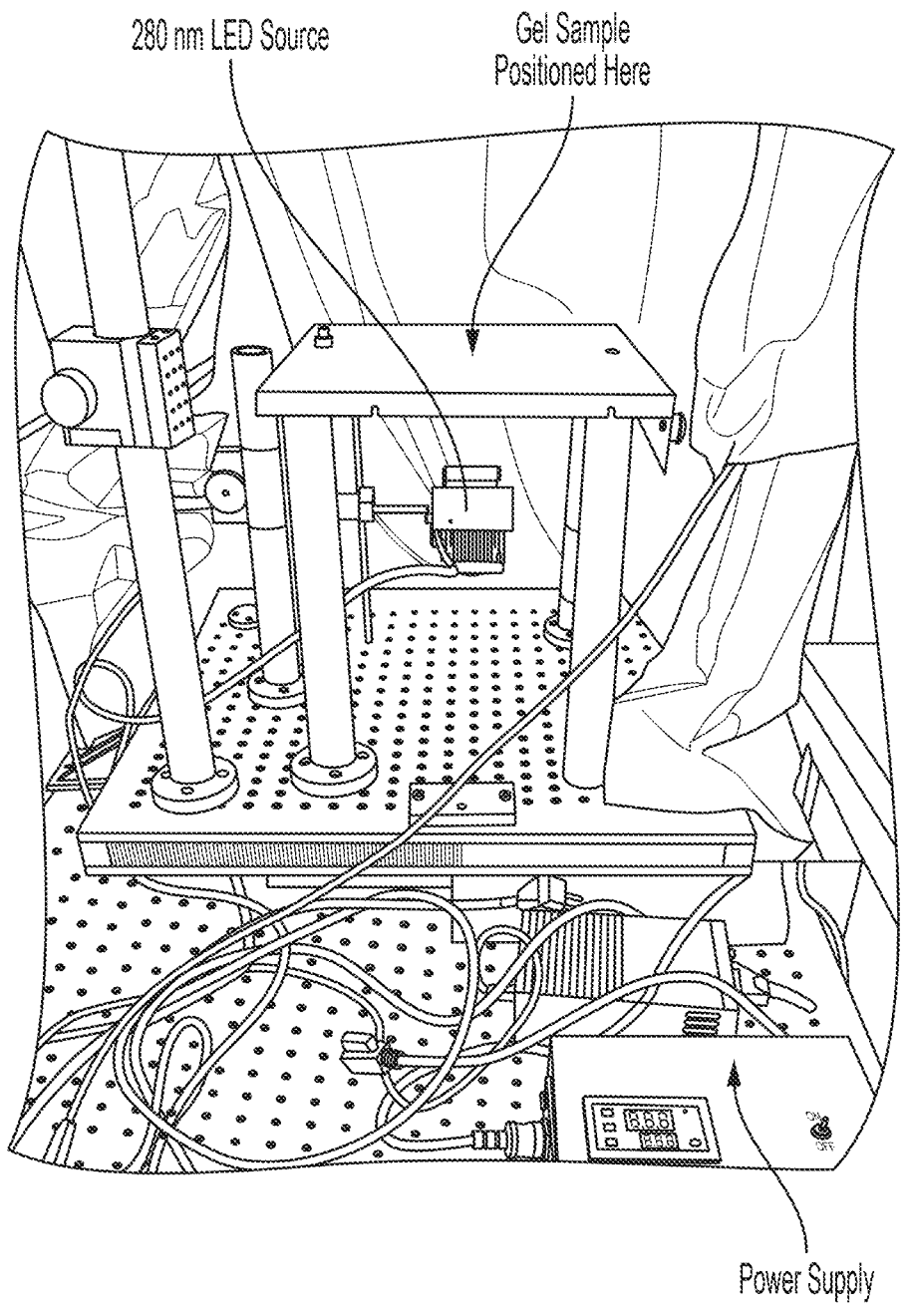
FIG. 7 is a perspective view of another prototype of a LED assembly of an illuminator apparatus illuminating at a wavelength of 280 nm for testing of activation time according to an embodiment of the subject invention.

FIG. 7 shows a perspective view of another prototype of a LED assembly of a illuminator apparatus illuminating at a wavelength of 280 nm for testing of activation time according to an embodiment of the subject invention. The LED assembly can comprise a support on which a gel sample is placed, an LED source illuminating light at a wavelength of 280 nm that is incident upon the gel sample, and a power supply for providing power to the LED source.

Example 4: Epifluorescence (EPI) Illuminator

In one embodiment, the illumination apparatus 100 can comprise LEDs generating epifluorescence (EPI) illumination comprising ultraviolet (UV), blue, green and red or a combination of these colors to image various types of gel samples.

Figure 8:
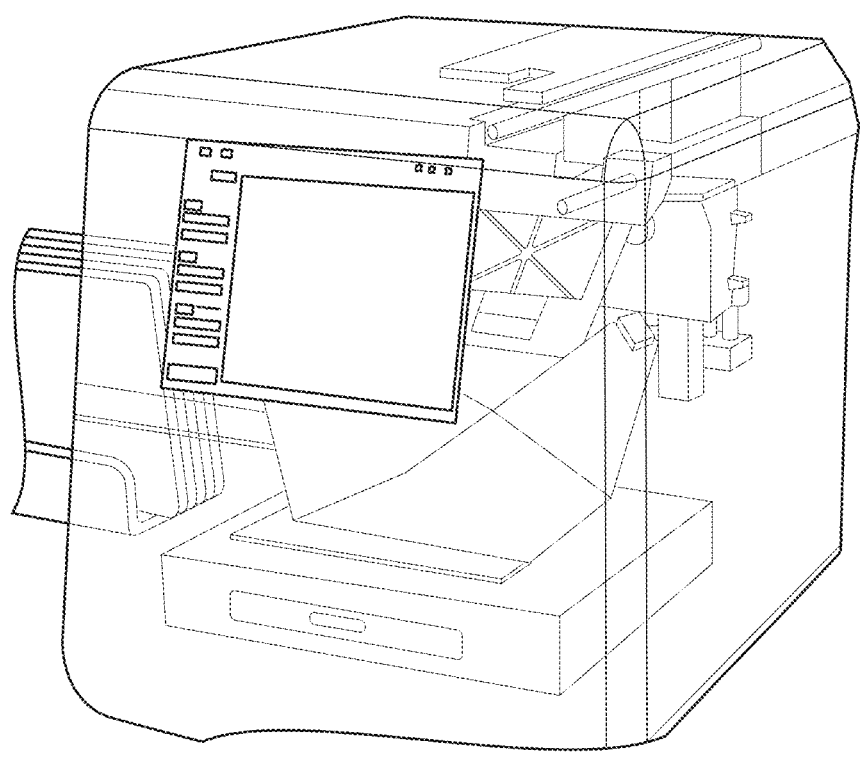
FIG. 8 is a perspective view of a prototype of an illuminator apparatus having an epifluorescence (EPI) illumination for stain-free activation of a gel that comprises a product of UV light induced reaction between tryptophan and a haloalkane at a wavelength of 280 nm (excision done with longer wavelengths) according to an embodiment of the subject invention.

FIG. 8 shows a perspective view of a prototype of the illuminator apparatus having an epifluorescence (EPI) illumination for stain-free activation of a gel, such as the Stain-Free™ gel, that comprises a product of UV light induced reaction between tryptophan and a haloalkane at a wavelength of 280 nm (excision done with longer wavelengths) according to an embodiment of the subject invention.

Example 5: Illuminator Having LEDs of High Intensity

In one embodiment, the controller 130 of the illuminator apparatus 100 can be configured such that the at least one first plurality of LEDs 111 or the at least one second plurality of LEDs 116 achieves a full intensity, for example 4 to 10 times higher than the intensity of the UV bulb-based convention transilluminator, allowing for more thorough activation and faster activation to save the user time.

In one embodiment, the light emitted from the first light source array 110 and/or the second light source array 115 of the illuminator apparatus 100 incidents upon a sample comprising one or more gels, such as the Stain-Free™ gel, that are products of UV light induced reaction between tryptophan and a haloalkane.

In one embodiment, the light emitted from the first light source array 110 and/or the second light source array 115 of the illuminator apparatus 100 comprises ultraviolet (UV) light. For example, the UV light may be in a wavelength range of about 200-about 325 nm, preferably about 250-about 320 nm with a peak of about 280 nm for activating the gels, such as the Stain-Free™ gel, that comprise products of UV light induced reaction between tryptophan and a haloalkane.

In one embodiment, the light emitted from the first light source array 110 and/or the second light source array 115 of the illuminator apparatus 100 comprises visible light.

In one embodiment, the light emitted from the first light source array 110 and/or the second light source array 115 of the illuminator apparatus 100 comprises substantially blue light emission.

In one embodiment, the light emitted from the first light source array 110 and/or the second light source array 115 of the illuminator apparatus 100 comprises substantially green light emission.

In one embodiment, the light emitted from the first light source array 110 and/or the second light source array 115 of the illuminator apparatus 100 comprises substantially red light emission.

In one embodiment, the light emitted from the first light source array 110 and/or the second light source array 115 of illuminator apparatus 100 comprises substantially white light emission.

In one embodiment, the light emitted from the first light source array 110 and/or the second light source array 115 of the illuminator apparatus 100 excites a fluorescent response of a sample.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The subject invention includes, but is not limited to, the following exemplified embodiments.

Embodiment 1. An illuminator apparatus, comprising:
a housing;
a first light source array disposed on at least one first side surface of the housing, including at least one first plurality of LEDs operable to output light within a first range of wavelengths; and
a controller for controlling ranges of operational parameters of the at least one first plurality of LEDs.

Embodiment 2. The illuminator apparatus according to embodiment 1, the controller is configured to control the intensity of the at least one first plurality of LEDs.

Embodiment 3. The illuminator apparatus according to any of embodiments 1-2, further comprising:
a second light source array disposed on any side surface of the housing, including at least one second plurality of LEDs operable to output light within a second range of wavelengths.

Embodiment 4. The illuminator apparatus according to any of embodiments 1-3, wherein the first light source array is a one-dimensional or a two-dimensional array of a plurality of the first LEDs.

Embodiment 5. The illuminator apparatus according to embodiment 4, wherein the first light source array includes a plurality of the first LED operable to output light within the first range of wavelengths.

Embodiment 6. The illuminator apparatus according to embodiment 5, wherein the controller is configured to select first LEDs to emit light of one predetermined color.

Embodiment 7. The illuminator apparatus according to embodiment 5, wherein the controller is configured to adjust the wavelengths of one or more first LEDs to emit lights of a variety of different colors.

Embodiment 8. The illuminator apparatus according to any of embodiments 1-7, further comprising at least one LED light emission cone disposed on the first side surface of the housing, surrounding the at least one first plurality of LEDs to collect light emitted by the LED and transmit the light through the housing.

Embodiment 9. The illuminator apparatus according to embodiment 8, further comprising a total internal reflection (TIR) layer disposed in a central space of the housing, configured such that light emitted by the at least one first plurality of LEDs propagates through the TIR layer within space of the housing.

Embodiment 10. The illuminator apparatus according to embodiment 9, further comprising a diffusing layer disposed on a top surface of the TIR layer for diffusing light.

Embodiment 11. The illuminator apparatus according to embodiment 10, further comprising a plurality of vertical prism layers disposed on a top surface of the diffusing layer.

Embodiment 12. The illuminator apparatus according to embodiment 11, further comprising a retaining structure such as a clip disposed on inner side surfaces of the housing to surround entire perimeter of housing.

Embodiment 13. The illuminator apparatus according to any of embodiments 1-12, wherein the controller is configured to modulate an intensity of light output from the first light source array by adjusting optical power of the first light source array.

Embodiment 14. The illuminator apparatus according to any of embodiments 1-13, wherein the controller is configured to modulate the intensity of light output from the first light source array.

Embodiment 15. The illuminator apparatus according to embodiment 14, wherein the optimum wavelength for maximum relative stain-free activation efficiency is determined to be about 280 nanometers (nm).

Embodiment 16. The illuminator apparatus according to embodiment 15, when the at least one first plurality of LEDs emits light having the optimum wavelength of about 280 nm, the controller is configured to adjust optical power of the at least one first plurality of LEDs to modify various stain-free activation time of the at least one first plurality of LEDs.

Embodiment 17. The illuminator apparatus according to any of embodiments 1-16, wherein the controller is configured to modulate an intensity of light output from the first light source array to determine an optimum intensity for thorough activation or fast activation of a sample upon which the light is incident.

Embodiment 18. The illuminator apparatus according to embodiment 1, wherein the light emitted from the first light source array incidents upon a sample comprising a gel that comprises a product of UV light induced reaction between tryptophan and a haloalkane.

Embodiment 19. The illuminator apparatus according to embodiment 1, wherein the light emitted from the first light source array comprises ultraviolet (UV) light or visible light.

Embodiment 20. The illuminator apparatus according to embodiment 1, wherein the light emitted from the first light source array excites a fluorescent response of a sample.

Embodiment 21. An illuminator system comprising:
the illuminator apparatus of embodiment 1; and
a detector for detecting the light output.

Embodiment 22. An illuminator apparatus, comprising:
a housing;
a first light source array disposed in the housing, including at least one first plurality of LEDs operable to output light within a first range of wavelengths;
a second light source array disposed in the housing, including at least one second plurality of LEDs operable to output light within a second range of wavelengths;
a controller for controlling the range of the wavelengths of the at least one first plurality of LEDs;
wherein the first light source array and the second light source array each is a two-dimensional array, and
wherein the first light source array and the second light source array interlace with each other.

Embodiment 23. An epifluorescence (EPI) illuminator apparatus, comprising:
a housing;
a first light source array disposed in the housing, including at least one first plurality of LEDs operable to output light within a first range of wavelengths of about 200 nm to about 325 nm with a peak of about 280 nm for activating gels that comprise products of UV light induced reaction between tryptophan and a haloalkane; and
a controller for controlling the intensity of the at least one first plurality of LEDs.

As a person skilled in the art will recognize from the previous detailed description and from the figures and claims, modifications and changes can be made to the embodiments of the invention without departing from the scope of this invention defined in the following claims.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:
1. An illuminator apparatus, comprising:
a housing;
a first light source array disposed on at least one first side surface of the housing, including at least one first plurality of LEDs configured to output first light of a first wavelength of 280 nm such that a maximum efficiency for driving reactions between tryptophan and haloalkanes of a gel is achieved;
a second light source array disposed on at least one second side surface of the housing, including at least one second plurality of LEDs configured to output second light of a second wavelength within a range of from 200 nm to 780 nm and different from the first wavelength such that excitation of the gel is visualized;
a controller for controlling ranges of operational parameters of the at least one first plurality of LEDs and the at least one second plurality of LEDs, wherein the controller is configured to modulate an intensity of light output from the first light source array by adjusting optical power of the first light source array and wherein the controller is configured to adjust the wavelengths of at least one first plurality of LEDs to emit lights of a variety of different colors;

at least one LED light emission cone disposed on the at least one first side surface and the at least one second side surface of the housing, surrounding the at least one first plurality of LEDs and the at least one second plurality of LEDs to collect light emitted by the LED and transmit the light through the housing;

a plurality of vertical prism layers;

a clip disposed on inner side surfaces of the housing to surround an entire perimeter of the housing; and a total internal reflection (TIR) layer disposed in a central space of the housing, wherein the TIR layer is configured such that light emitted by the at least one first plurality of LEDs propagates through the TIR layer within space of the housing;

a diffusing layer disposed on a top surface of the TIR layer for diffusing light;

the plurality of vertical prism layers disposed on a top surface of the diffusing layer; and a retaining structure disposed on inner side surfaces of the housing to surround the entire perimeter of the housing;

wherein the TIR layer comprises a plate made of borosilicate glass or quartz, a light-scattering pattern being formed on one side of the plate such that the light incident on elements of the light-scattering pattern is not reflected and is instead emitted toward a sample when an incident angle of the incident light is greater than a TIR angle, wherein the TIR layer is formed with a tapered shape, wherein the light-scattering pattern is applied by laser etching, wherein the first light source array is a one-dimensional array of the at least one first plurality of LEDs, and the second light source array is a one-dimensional array of the at least one second plurality of LEDs, wherein the controller is configured to individually switch on or off a different LED to emit lights of a variety of different colors, each LED being individually operable to emit light of a predetermined color within a range of wavelengths, and wherein the illuminator apparatus further comprises a reflective layer disposed on a bottom surface of the TIR layer.

2. The illuminator apparatus according to claim 1, wherein the controller is configured to vary the intensity of one or more LEDs of the at least one first plurality of LEDs.

3. The illuminator apparatus according to claim 1, wherein the TIR layer is formed with random or patterned diffusing surface.

4. The illuminator apparatus according to claim 1, wherein the controller is configured to modulate the intensity of light output from the first light source array.

5. The illuminator apparatus according to claim 4, wherein, when the at least one first plurality of LEDs emits light having the optimum wavelength of 280 nm, the controller is configured to adjust optical power of the at least one first plurality of LEDs to vary activation time of the at least one first plurality of LEDs.

6. The illuminator apparatus according to claim 1, wherein the controller is configured to modulate an intensity of light output from the first light source array to determine an optimum intensity for thorough activation or fast activation of a sample upon which the light is incident.

7. The illuminator apparatus according to claim 1, wherein the light emitted from the first light source array is incident upon a sample comprising the gel that comprises a product of UV light induced reaction between tryptophan and a haloalkane.

8. The illuminator apparatus according to claim 1, wherein the light emitted from the first light source array excites a fluorescent response of a sample.

9. An imaging system comprising:

the illuminator apparatus according to claim 1; and a detector for detecting the light output.

10. An illuminator apparatus, comprising:

a housing;

a first light source array disposed in the housing, including at least one first plurality of LEDs configured to output first light of a first wavelength of 280 nm such that a maximum efficiency for driving reactions between tryptophan and haloalkanes of a gel is achieved;

a second light source array disposed in the housing, including at least one second plurality of LEDs configured to output second light of a second wavelength within a range of from 200 nm to 780 nm and different from the first wavelength such that excitation of the gel is visualized;

a controller for selecting the at least one first plurality of LEDs of a certain wavelength and the at least one second plurality of LEDs, wherein the controller is configured to modulate an intensity of light output from the first light source array by adjusting optical power of the first light source array and wherein the controller is configured to adjust the wavelengths of at least one first plurality of LEDs to emit lights of a variety of different colors;

at least one LED light emission cone disposed on the at least one first side surface and the at least one second side surface of the housing, surrounding the at least one first plurality of LEDs and the at least one second plurality of LEDs to collect light emitted by the LED and transmit the light through the housing;

a plurality of vertical prism layers disposed on a top surface of a diffusing layer;

a clip disposed on inner side surfaces of the housing to surround an entire perimeter of the housing; and a total internal reflection (TIR) layer disposed in a central space of the housing, configured such that light emitted by the at least one first plurality of LEDs propagates through the TIR layer within space of the housing;

a diffusing layer disposed on a top surface of the TIR layer for diffusing light; and a retaining structure disposed on inner side surfaces of the housing to surround the entire perimeter of the housing;

wherein the TIR layer comprises a plate made of borosilicate glass or quartz, a light-scattering pattern being formed on one side of the plate such that the light incident on elements of the light-scattering pattern is not reflected and is instead emitted toward a sample when an incident angle of the incident light is greater than a TIR angle, wherein the first light source array and the second light source array each is a two-dimensional array, wherein the first light source array and the second light source array interlace with each other, and wherein the TIR layer is formed with a tapered shape, wherein the light-scattering pattern is applied by laser etching, wherein the first light source array is a one-dimensional array of the at least one first plurality of LEDs, and the second light source array is a one-dimensional array of the at least one second plurality of LEDs, wherein the controller is configured to individually switch on or off a different LED to emit lights of a variety of different colors, each LED being individually operable to emit light of a predetermined color within a range of wavelengths, and wherein the illuminator apparatus further comprises a reflective layer disposed on a bottom surface of the TIR layer.

11. An apparatus, comprising:

a housing;

a first light source array disposed in the housing, including at least one plurality of LEDs configured to output first light of a first wavelength of 280 nm such that a maximum efficiency for driving reactions between tryptophan and haloalkanes of a gel is achieved;

a second light source array disposed on at least one side surface of the housing, including at least one second plurality of LEDs configured to output second light of a second wavelength within a range of from 200 nm to 780 nm and different from the first wavelength such that excitation of the gel is visualized;

a controller for selecting the at least one plurality of LEDs of a certain wavelength, wherein the controller is configured to modulate an intensity of light output from the first light source array by adjusting optical power of the first light source array and wherein the controller is configured to adjust the wavelengths of at least one first plurality of LEDs to emit lights of a variety of different colors;

at least one LED light emission cone disposed on the at least one first side surface and the at least one second side surface of the housing, surrounding the at least one first plurality of LEDs and the at least one second plurality of LEDs to collect light emitted by the LED and transmit the light through the housing;

a total internal reflection (TIR) layer disposed in a central space of the housing, configured such that light emitted by the at least one first plurality of LEDs propagates through the TIR layer within space of the housing, a diffusing layer disposed on a top surface of the TIR layer for diffusing light;

a plurality of vertical prism layers disposed on a top surface of the diffusing layer; and a retaining structure disposed on inner side surfaces of the housing to surround the entire perimeter of the housing;

wherein the TIR layer comprises a plate made of borosilicate glass or quartz, a light-scattering pattern being formed on one side of the plate such that the light incident on elements of the light-scattering pattern is not reflected and is instead emitted toward a sample when an incident angle of the incident light is greater than a TIR angle, wherein the apparatus is an epifluorescence (EPI) illuminator apparatus, wherein the TIR layer is formed with a tapered shape, wherein the light-scattering pattern is applied by laser etching, wherein the first light source array is a one-dimensional array of the at least one first plurality of LEDs, and the second light source array is a one-dimensional array of the at least one second plurality of LEDs, wherein the controller is configured to individually switch on or off a different LED to emit lights of a variety of different colors, each LED being individually operable to emit light of a predetermined color within a range of wavelengths, and wherein the apparatus further comprises a reflective layer disposed on a bottom surface of the TIR layer.

* * * * *